(12) United States Patent
Nakagawa et al.

(10) Patent No.: US 11,280,741 B2
(45) Date of Patent: Mar. 22, 2022

(54) BIOLOGICAL SAMPLE ANALYSIS DEVICE

(71) Applicant: HORIBA Advanced Techno, Co., Ltd., Kyoto (JP)

(72) Inventors: Kazuya Nakagawa, Kyoto (JP); Hideki Nakayama, Kyoto (JP); Kimihiko Arimoto, Kyoto (JP); Yoko Nakai, Kyoto (JP)

(73) Assignee: HORIBA ADVANCED TECHNO, CO., LTD., Kyoto (JP)

( * ) Notice: Subject to any disclaimer, the term of this patent is extended or adjusted under 35 U.S.C. 154(b) by 171 days.

(21) Appl. No.: 16/616,232

(22) PCT Filed: Jul. 17, 2018

(86) PCT No.: PCT/JP2018/026789
§ 371 (c)(1),
(2) Date: Nov. 22, 2019

(87) PCT Pub. No.: WO2019/013360
PCT Pub. Date: Jan. 17, 2019

(65) Prior Publication Data
US 2020/0110033 A1    Apr. 9, 2020

(30) Foreign Application Priority Data

Jul. 14, 2017   (JP) .............................. JP2017-138551

(51) Int. Cl.
*G01N 21/76* (2006.01)
*G01N 21/01* (2006.01)
(Continued)

(52) U.S. Cl.
CPC ........... *G01N 21/763* (2013.01); *G01N 21/01* (2013.01); *G01N 35/04* (2013.01); *B01L 9/06* (2013.01);
(Continued)

(58) Field of Classification Search
CPC ...... G01N 21/763; G01N 35/04; G01N 21/01; G01N 2035/0444; G01N 2201/064;
(Continued)

(56) References Cited

U.S. PATENT DOCUMENTS

2008/0261294 A1   10/2008   Noda et al.
2015/0253250 A1    9/2015   Noda et al.
(Continued)

FOREIGN PATENT DOCUMENTS

JP    06-201586 A    7/1994
JP    07-218641 A    8/1995
(Continued)

OTHER PUBLICATIONS

Translation of JP 2000180368A, Watabe, Shigeo, Jun. 30, 2000 (Year: 2000).*
(Continued)

*Primary Examiner* — Matthew D Krcha
*Assistant Examiner* — Henry H Nguyen
(74) *Attorney, Agent, or Firm* — Alleman Hall Creasman & Tuttle LLP (57) ABSTRACT

The present invention is one that intends to achieve improvements in both analysis efficiency and analysis accuracy without difficulty, and a biological substance analysis device that analyzes light derived from a biological substance in a sample, and the biological substance analysis device includes: a holder that holds multiple containers containing the sample; a photodetector that is fixed at a predetermined position; a holder driving mechanism that moves the holder to position each of the containers held in the holder at a detection position by the photodetector in sequence; and a light shielding mechanism that, while guiding light emitted from the sample in a container at the detection position to the photodetector, prevents light emit-
(Continued)

ted from the sample in the other containers from being guided to the photodetector.

8 Claims, 9 Drawing Sheets

(51) Int. Cl.
*G01N 35/04* (2006.01)
*G01N 21/17* (2006.01)
*G01N 21/13* (2006.01)
*G01N 35/02* (2006.01)
*B01L 9/06* (2006.01)

(52) U.S. Cl.
CPC ........... *G01N 21/17* (2013.01); *G01N 35/025* (2013.01); *G01N 2021/135* (2013.01); *G01N 2035/0401* (2013.01); *G01N 2035/0444* (2013.01); *G01N 2201/064* (2013.01); *G01N 2201/0646* (2013.01); *G01N 2201/0648* (2013.01)

(58) Field of Classification Search
CPC ... G01N 2201/0646; G01N 2201/0648; G01N 35/025; G01N 2035/0401; G01N 21/17; G01N 2021/135; G01N 21/274; B01L 9/06
See application file for complete search history.

(56) References Cited

U.S. PATENT DOCUMENTS

| | | |
|---|---|---|
| 2016/0245935 A1 | 8/2016 | Hanaya |
| 2017/0307534 A1 | 10/2017 | Nakamura et al. |
| 2018/0024070 A1 | 1/2018 | Okanojo et al. |
| 2018/0259460 A1 | 9/2018 | Konishi et al. |

FOREIGN PATENT DOCUMENTS

| | | | | |
|---|---|---|---|---|
| JP | 2000180368 A | * | 6/2000 | |
| JP | 2008268019 A | | 11/2008 | |
| JP | 2010183866 A | | 8/2010 | |
| WO | WO-9508774 A2 | * | 3/1995 | ........... G01N 35/025 |
| WO | 2004083857 A1 | | 9/2004 | |
| WO | 2016052704 A1 | | 4/2016 | |
| WO | 2016174766 A1 | | 11/2016 | |
| WO | 2017033641 A1 | | 3/2017 | |

OTHER PUBLICATIONS

European Patent Office, Extended European Search Report Issued in Application No. 18832384.4, dated Mar. 5, 2021, Germany, 9 pages.
ISA Japan Patent Office, International Search Report Issued in International Application No. PCT/JP2018/026789, dated Sep. 4, 2018, WIPO, 2 pages.

* cited by examiner

BIOLOGICAL SAMPLE ANALYSIS DEVICE

TECHNICAL FIELD

The present invention relates to a biological sample analysis device that analyzes light generated by an organism-derived substance contained in a sample.

BACKGROUND ART

In the past, microbiological monitoring has been performed for environmental management of pharmaceutical manufacturing plants, food plants, and the like. As an example of the microbiological monitoring, there is a method that adds luciferase as a luminescent reagent to ATP (adenosine triphosphate) contained in microorganisms to measure the resulting bioluminescence and converts the resulting luminescence intensity into a bacterial count.

In addition, as a device that analyzes light generated by an organism-derived substance such as the ATP, one disclosed in Patent Literature 1 has been conceived. This biological sample analysis device includes: a holder that holds a single container containing a sample; and a light shielding box containing a photodetector, and is configured to detect light emitted from the sample in the container by installing the holder in the light shielding box.

However, in the configuration using the holder holding a single container, every time measurement of a single container is ended, the work of detaching the holder from the light shielding box and attaching the holder holding another container, the work of detaching the container from the holder and attaching another container, or the like is required, causing the problem of poor analysis efficiency.

CITATION LIST

Patent Literature

[Patent Literature 1]
Japanese Unexamined Patent Publication JP-A2008-268019

SUMMARY OF INVENTION

Technical Problem

Therefore, in order to improve analysis efficiency, the present inventor is advancing the development of a biological sample analysis device adopting a configuration for making a holder hold multiple containers and moving each container to a detection position by a photodetector in sequence by rotating the holder or other means.

However, bioluminescence caused by an organism-derived substance such as ATP continues while attenuating even after the end of measurement by the photodetector. For this reason, light is emitted also from a container after the end of the measurement which has been moved from the detection position by the photodetector to another position. As a result, when detecting light from a container moved to the detection position by the photodetector, the light emitted from the container after the end of the measurement may be detected by the photodetector to serve as noise, making it difficult to improve analysis accuracy (detection limits).

Therefore, the present invention has been made in order to solve the above-described problem, and the main object thereof is to achieve improvements in both analysis efficiency and analysis accuracy (detection limits) without difficulty in a biological sample analysis device that analyzes light generated by an organism-derived substance contained in a sample.

Solution to Problem

That is, the biological sample analysis device according to the present invention is a biological sample analysis device that analyzes light generated by an organism-derived substance contained in a sample, and includes: a holder that holds multiple containers containing the sample; a photodetector that is fixed at a predetermined position; a holder driving mechanism that moves the holder to position each of the containers held in the holder at a detection position by the photodetector in sequence; and a light shielding mechanism that, while guiding light emitted from the sample in a container at the detection position to the photodetector, prevents light emitted from the sample in the other containers from being guided to the photodetector.

Since such a biological sample analysis device moves the holder holding the multiple containers to position each of the containers at the detection position by the photodetector in sequence, the need for work such as after the end of measurement of the sample in one container, detaching the container from the holder and attaching another container is eliminated, making it possible to improve analysis efficiency. Also, since the light shielding mechanism that, while guiding light emitted from the sample in a container at the detection position to the photodetector, prevents light emitted from the sample in the other containers from being guided to the photodetector is provided, noise caused by light emitted from the sample in containers after the end of the measurement can be reduced to improve analysis accuracy (detection limits). As described, according to the present invention, in the biological sample analysis device, improvements in both the analysis efficiency and the analysis accuracy (detection limits) can be achieved without difficulty.

In order to improve the analysis efficiency by automatically introducing a reagent to the sample in a container, it is desirable that the biological sample analysis device further includes a dispensing mechanism that, into the containers, introduces a reagent that reacts with the organism-derived substance to generate light.

In this case, when introducing the reagent into the container, from a point in time when the organism-derived substance and the reagent contact, they react to start luminescence. For this reason, the dispensing mechanism introduces the reagent into the container at the detection position, and thereby light can be detected without being leaked from a point in time when the luminescence is started.

As a specific embodiment of the light shielding mechanism, it is conceivable that the light shielding mechanism includes: container side light shielding parts that are provided to the respective containers and cover upper parts of the respective containers; and a movable side light shielding part that moves back and forth with respect to the container at the detection position, as well as covers a lower part of the container at the detection position. As described, by configuring the light shielding mechanism to separately include the members fixed to the container sides and the member movable with respect to the container, the need to cover the whole of the container with the movable member is eliminated, thus making it possible to configure the movable member compactly, as well as to simplify the configuration.

Note that the movable side light shielding part slides with respect to the container and thereby static electricity may be generated on the container. In the present invention, by separating the container side light shielding part and the movable side light shielding part, the boundary part between them can be positioned in the lower part of the container, and a sliding part of the movable side light shielding part with respect to the container can be made small. This makes it difficult to generate static electricity on the container even when the movable side light shielding part slides with respect to the container. By suppressing the generation of static electricity as described, noise due to luminescence associated with the discharge of static electricity can be reduced.

In addition, when the movable side light shielding part is one including a reflector that guides the light emitted from the sample in the container at the detection position to the photodetector, the light emitted from the sample can be efficiently guided to the photodetector. Also, the function of the movable side light shielding part can be fulfilled by the reflector, thus making it possible to simplify a device configuration.

Note that in cases such as when the photodetector is on the lower side of the container at the detection position, the reflector is one having a shape that is expanded downward. This configuration makes it possible to increase a distance of the movable side light shielding part (reflector) with respect to the side surface of the container to achieve a structure making it more difficult to generate static electricity.

In order to not only shield light emitted from containers after the end of the measurement but further reduce noise by shielding other stray light as well, it is desirable that the light shielding mechanism is one that covers the entire circumferences of the containers.

In a configuration for moving the photodetector together with the movable side light shielding part of the light shielding mechanism, noise may affect the photodetector because of vibration and electric signals caused by a mechanism (e.g., a motor) for moving the photodetector. For this reason, it is desirable that the light shielding mechanism is one that shields the photodetector from light by moving the movable side light shielding part without moving the photodetector. Also, the photodetector is configured not to be moved, and thereby the photodetection surface of the photodetector can be kept constant at every time of measurement, making it possible to improve measurement reproducibility.

As a specific configuration of the movable side light shielding part and its operation mode, it is desirable that the movable side light shielding part includes: a reflector that moves up and down with respect to the container at the detection position; and a light guiding member that moves back and forth between the reflector and the photodetector, in which in a state where the reflector is in a lifted position of covering the lower part of the container, the light guiding member gets in between the reflector and the photodetector, and in a state where the light guiding member is in a withdrawal position of being withdrawn from between the reflector and the photodetector, the reflector is separated from the lower part of the container.

It is desirable that the movements of the reflector and the light guiding member are configured by a single motor, a rack-and-pinion mechanism that converts rotation of the motor into a rectilinear movement, and multiple cam mechanisms that are operated by the rectilinear movement of the rack-and-pinion mechanism.

In this configuration, the respective positions of the reflector and the light guiding member are mechanically determined by the cam mechanisms, making it possible to improve the measurement reproducibility. Also, driving is performed by the single motor, and therefore as compared with the use of multiple motors, maintenance is facilitated.

When opening a cover body as an opening/closing door in the biological sample analysis device, the photodetection surface of the photodetector (e.g., photomultiplier (PMT)) may be deteriorated or damaged upon receipt of external intense light. For this reason, it is desirable to provide a shutter member for protecting the photodetector at the front of the photodetector. In addition, it is desirable that, in conjunction with the movements of the reflector and the light guiding member, the shutter member moves to a shielding position of shielding light incident on the photodetector.

Advantageous Effects of Invention

According to the present invention configured as described, both the holder driving mechanism that drives the holder holding the multiple containers and the light shielding mechanism that shields light emitted from the sample in containers other than a container at the detection position are provided, and therefore in the biological sample analysis device that analyzes light generated by the organism-derived substance contained in the sample, improvements in both analysis efficiency and analysis accuracy (detection limits) can be achieved without difficulty.

LIST OF REFERENCE CHARACTERS

100 Biological sample analysis device
$X_{det}$ Detection position
2 Container
3 Holder
4 Photodetector
5 Holder driving mechanism
6 Dispensing mechanism 11 Reflector
13 Light shielding mechanism
131 Container side light shielding part
132 Movable side light shielding part

DESCRIPTION OF EMBODIMENTS

In the following, one embodiment of the biological sample analysis device according to the present invention will be described with reference to the drawings.

<Device Configuration>

A biological sample analysis device 100 of the present embodiment is one that analyzes light generated by an organism-derived substance contained in a sample and thereby measures the content of the organism-derived substance. Note that, in the following, an ATP content measuring device that measures the content (amol ($=10^{-18}$ mol)) of ATP (adenosine triphosphate) as the organism-derived substance by detecting weak light generated from the ATP will be described.

Figure 1:
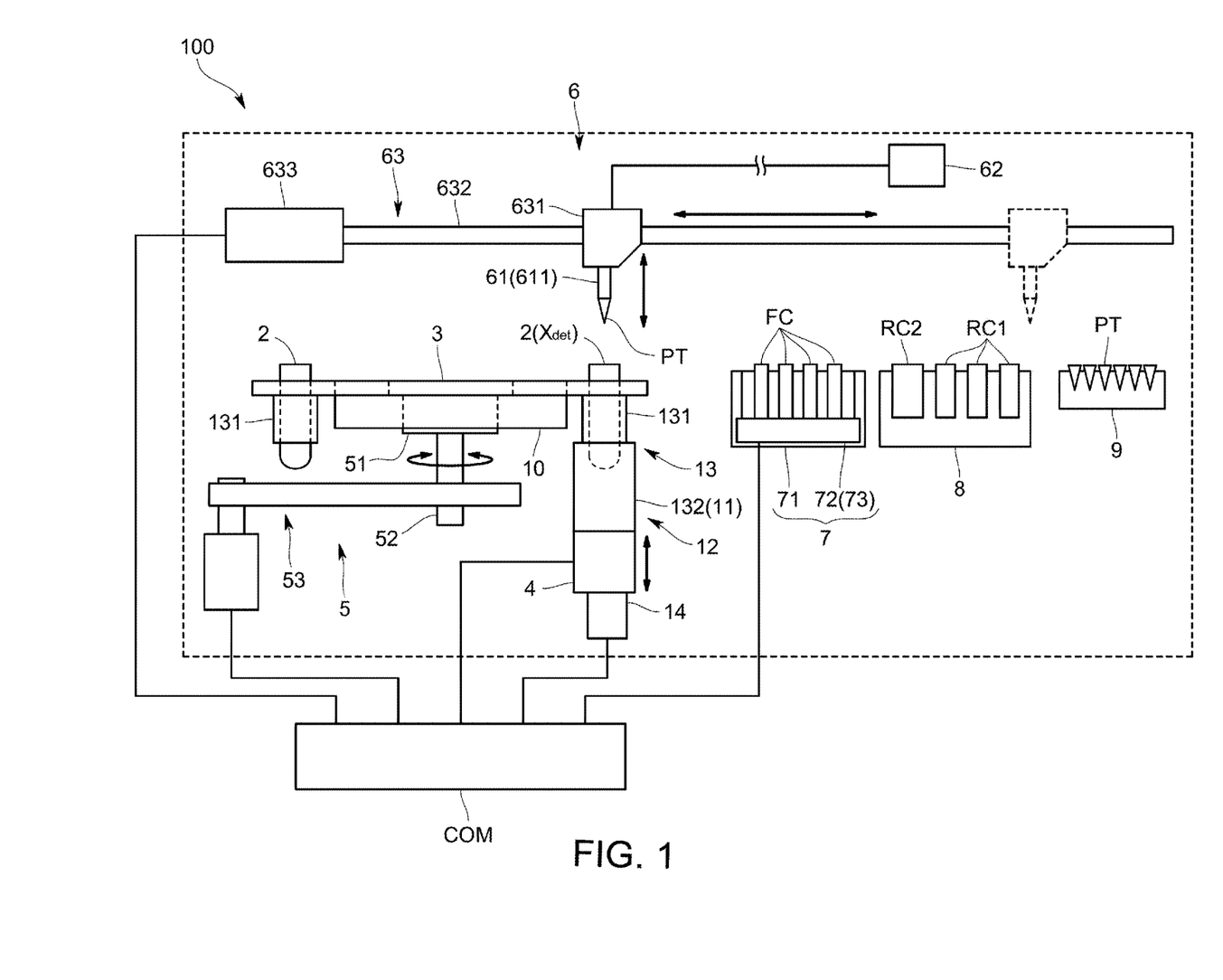
FIG. 1 is a schematic diagram illustrating the configuration of a biological sample analysis device according to the present embodiment.

Specifically, as illustrated in FIG. 1, the biological sample analysis device 100 includes: a holder 3 that holds multiple containers 2 containing the sample; a photodetector 4 that is fixed at a predetermined position; a holder driving mechanism 5 that moves the holder 3; and a dispensing mechanism 6 that performs dispensation of a luminescent reagent, which reacts with ATP to generate light, into a container 2 held in the holder 3, or the like.

Figure 2:
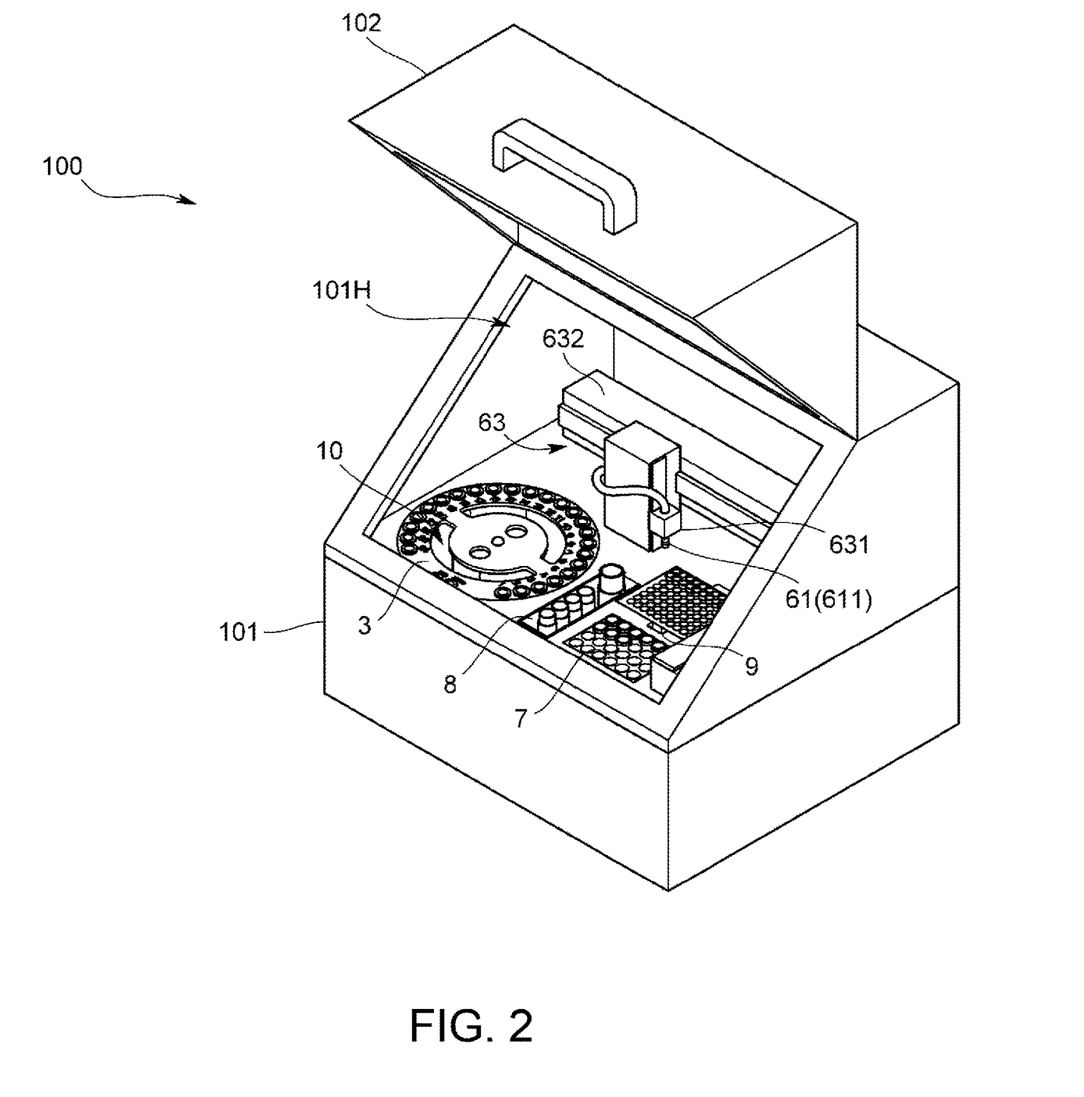
FIG. 2 is a perspective view illustrating the appearance of the biological sample analysis device in the same embodiment.
Figure 3:
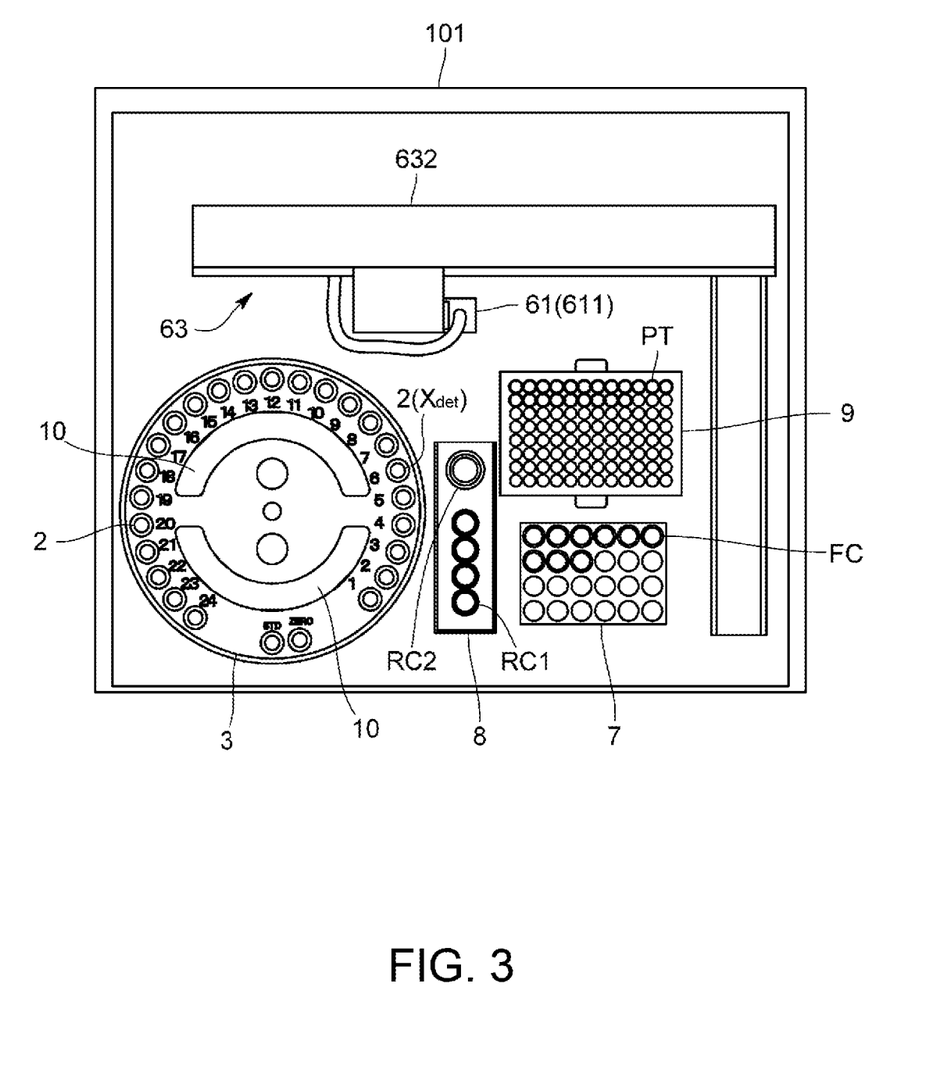
FIG. 3 is a plan view illustrating the arrangement of respective parts of device main body in the same embodiment.

In addition, as illustrated in FIG. 2 and FIG. 3, the biological sample analysis device 100 of the present embodiment includes: a device main body 101 placed on a base such as a clean bench; and a cover body 102 provided to the device main body 101. The device main body 101 is provided with measurement system equipment necessary for ATP measurement, such as the holder 3, the holder driving mechanism 5, and the dispensing mechanism 6. Further, the device main body 101 has an opening part 101H at the front. In addition, the cover body 102 is provided openably/closably with respect to the opening part 101H of the device main body 101. Specifically, it is adapted to be openable/closable by a horizontal connecting shaft (not illustrated) in the upper part of the opening part 101H, and by raising the cover body 102 upward, a user can access the inside of the device main body 101. Note that in a state where the cover body 102 is closed, a seal member (not illustrated) makes a seal between the cover body 102 and the opening part 101H to thereby bring the inside of the device into a dark room state.

Besides, the device main body 101 is provided with: a temperature control mechanism 7 that holds multiple specimen tubes FC containing specimens and performs temperature control; a reagent set part 8 in which reagent containers RC1, RC2 containing respective reagents are set; and a pipette tip set part 9 in which pipette tips PT to be used by the dispensing mechanism 6 are provided.

The temperature control mechanism 7 is one that contains and holds the multiple specimen tubes FC, for example, in a matrix. The temperature control mechanism 7 includes: a holder block 71 that holds the specimen tubes FC and is made of metal (e.g., made of aluminum); a heat source part 72 provided to the holder block 71, such as a heater; and a temperature sensor 73 for detecting the temperature of the holder block 71, such as a thermocouple. On the basis of the detected temperature by the temperature sensor 73, the heater 72 as the heat source part is controlled by a controller COM so that the temperature of the holder block 71 reaches a predetermined temperature.

The reagent set part 8 is one in which the reagent containers RC1 containing pretreatment reagents for performing pretreatment on a specimen and the reagent container RC2 containing the luminescent reagent are set. The pretreatment reagents are an ATP scavenger that scavenges ATP (free ATP) other than living cells (live bacteria) contained in the specimen, an ATP extracting agent that extracts ATP from the living cells, and the like.

Figure 4:
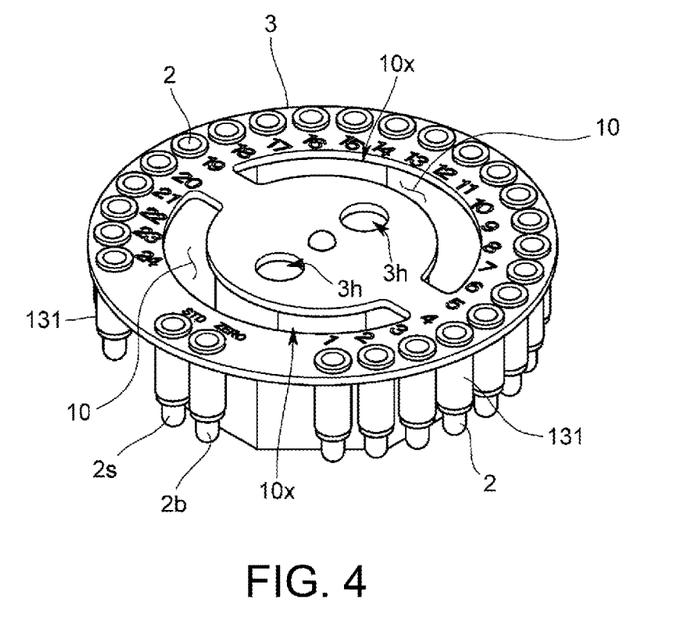
FIG. 4 is a perspective view illustrating a holder holding multiple containers in the same embodiment.
Figure 5:
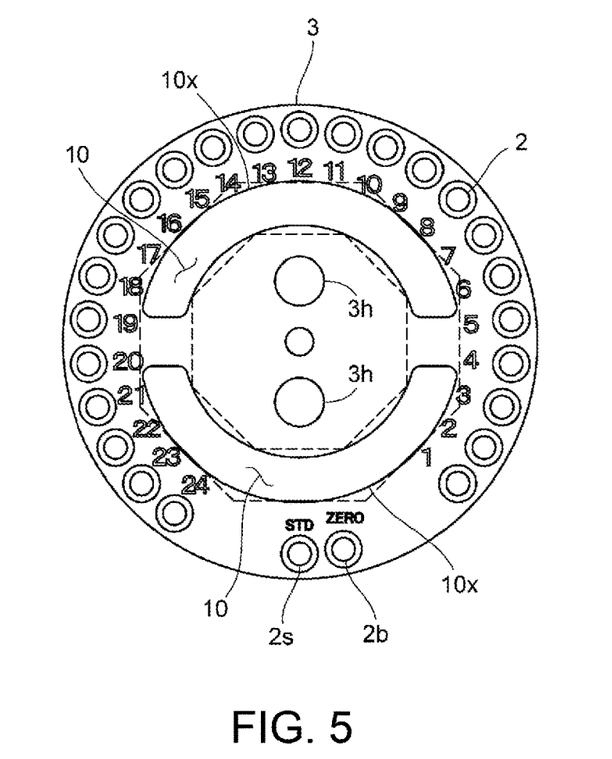
FIG. 5 is a plan view illustrating the holder holding the multiple containers in the same embodiment.

The holder 3 is one that is provided rotatably with respect to the device main body 101 and in particular, as illustrated in FIG. 4 and FIG. 5, holds the multiple containers 2 on the same circle with respect to a predetermined rotation center. The holder 3 in the present embodiment holds, in addition to the multiple containers 2 for sample measurement, a container 2b for blank measurement and a container 2s for standard solution measurement as well. Also, in the holder 3, on the inner side of the multiple containers 2, a disposal box 10 as a disposed tip containing part for disposing of a pipette tip PT of the dispensing mechanism 6 is integrally provided. The disposal box 10 has arc-shaped openings 10x in a plan view. Further, the holder 3 is configured to be attachable/detachable with respect to the device main body 101, and for ease of the attachment/detachment operation, formed with multiple (two in this case) holding holes 3h for holding. The holding holes 3h are through-holes for inserting fingers for holding, and provided on the inner sides than the openings 10x of the disposal box 10. Since the holding holes 3h are provided on the inner sides than the openings 10x, a hand can be prevented from carelessly contacting with a disposed pipette tip PT when holding the holder 3.

As illustrated in FIG. 1, the photodetector 4 is one that detects light emitted from the sample in a container 2 held in the holder 3, and in the present embodiment, for example, a photomultiplier (PMT). The photodetector 4 is provided on the lower side than the container 2 held in the holder 3. In addition, above the photodetector 4, an optical system 12 having a reflector 11 for guiding the light emitted from the sample in the container 2 to the photodetector 4 is provided. The reflector 11 is configured to be movable back and forth with respect to the container 2 positioned above them. By bringing the reflector 11 close to the container 2, the light emitted from the sample in the container 2 can be efficiently guided to the photodetector 4, and also by bringing the reflector 11 away from the container 2, the movement of the container 2 can be prevented from being obstructed. In addition, in the present embodiment, the rest of the optical system 12 including the reflector 11 and the photodetector 4 are configured to be movable back and forth with respect to the container 2.

The holder driving mechanism 5 is one that moves the holder 3 to position each of the containers 2 held in the holder 3 at a detection position $X_{det}$ by the photodetector 4 in sequence. Specifically, as illustrated in FIG. 1, the holder driving mechanism 5 includes: a mounting table 51 on which the holder 3 is mounted; a rotary shaft 52 for rotating the holder 3 mounted on the mounting table 51; and an actuator 53 for rotating the rotary shaft 52. In addition, the holder driving mechanism 5 is provided with a rotational position sensor (not illustrated) for detecting the rotational position of the holder 3. On the basis of a detection signal of the rotational position sensor, the actuator 53 is rotationally controlled by the controller COM so as to position a container 2 to be measured at the detection position $X_{det}$.

As illustrated in FIG. 1 to FIG. 3, the dispensing mechanism 6 includes: a nozzle 61 for sucking or discharging the sample or each reagent; a pump mechanism 62 that drives the suction or discharge through the nozzle 61 via a flow path connected to the nozzle 61, such as a syringe; and a nozzle moving mechanism 63 that moves the nozzle 61 in a predetermined direction.

The nozzle 61 includes a tip holder 611 for attachably/detachably holding a pipette tip PT for contacting with the sample or each reagent to hold it. The tip holder 611 is one formed with an internal flow path, of which the base end part is connected with the flow path and the tip opening part is connected with a pipette tip PT.

Also, the nozzle moving mechanism 63 is one that linearly moves the nozzle 61 in the horizontal direction (an X-axis direction and a Y-axis direction), as well as linearly moves the nozzle 61 in the vertical direction (a Z-axis direction). Specifically, the nozzle moving mechanism 63 includes: a movable member 631 that holds the nozzle 61; slide mechanisms 632 that are respectively provided in the X-axis direction, the Y-axis direction, and the Z-axis direction; and an actuator 633 for moving the movable member 631 along the slide mechanisms 632 in the respective directions. The actuator 633 and the pump mechanism 62 are controlled by the controller COM, and thereby respective operations in the ATP measurement are performed.

Figure 6:
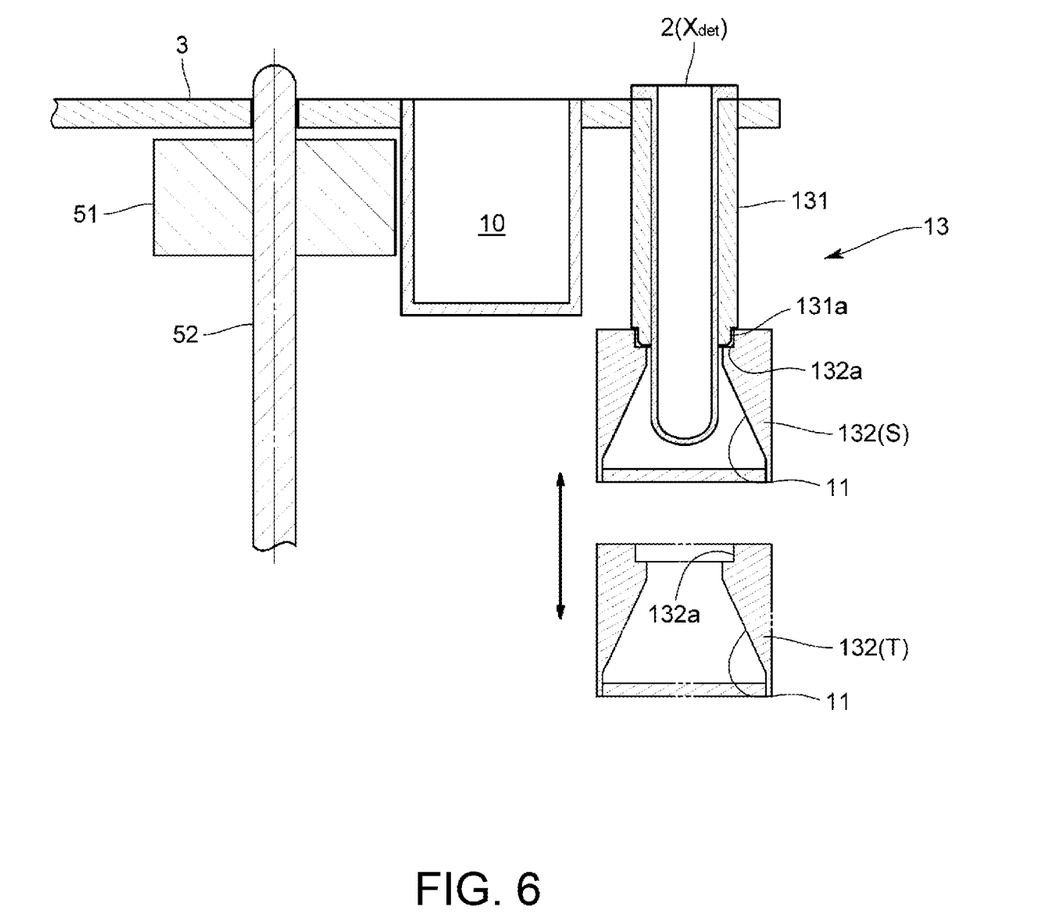
FIG. 6 is a cross-sectional view mainly illustrating a light shielding mechanism in the same embodiment.

Further, as illustrated in FIG. 6, the biological sample analysis device 100 of the present embodiment includes a light shielding mechanism 13 that, while guiding light emitted from the sample in a container 2 at the detection position $X_{det}$ to the photodetector 4, prevents light emitted from the sample in the other containers 2 (specifically, containers 2 after the end of the measurement) from being guided to the photodetector 4.

The light shielding mechanism 13 includes: container side light shielding parts 131 provided to the respective containers 2; and a movable side light shielding part 132 that moves back and forth with respect to a container 2 at the detection position $X_{det}$.

The container side light shielding parts 131 are ones that are formed of members not having optical transparency and cover the upper parts of the respective containers 2. Specifically, the container side light shielding parts 131 cover the entire circumferences of the upper parts of the respective containers 2. The present embodiment is configured to cover the entire circumference of the upper part of a container 2 held in the holder 3 with a container side light shielding part 131 by providing a container holding part of the holder 3 with the container side light shielding part 131 of a cylindrical shape and containing the container 2 in the container side light shielding part 131.

The movable side light shielding part 132 is one that is formed of a member not having optical transparency and covers a lower part other than the upper part covered with a container side light shielding part 131 in a container 2 at the detection position $X_{det}$. Specifically, the movable side light shielding part 132 covers the entire circumference of the lower part of the container 2 at the detection position $X_{det}$. The movable side light shielding part 132 moves up and down between a light shielding position S to cover the lower part of the container 2 at the detection position $X_{det}$ and a withdrawal position T separated downward from the lower part of the container 2. In addition, the up-and-down movement of the movable side light shielding part 132 is performed by a lifting and lowering device 14 using, for example, an actuator. The lifting and lowering device 14 is controlled by the controller COM in conjunction with the operations of the holder driving mechanism 5 and the dispensing mechanism 6.

The lower end part of the container side light shielding part 131 is formed with a first step part 131a over the entire circumference, and the upper end part of the movable side light shielding part 132 is formed with a second step part 132a corresponding to the first step part 131a over the entire circumference. In addition, in a state where the movable side light shielding part 132 is in the light shielding position S, the first step part 131a of the container side light shielding part 131 and the second step part 132a of the movable side light shielding part 132 engage together to cover both the upper part and the lower part of the container 2 at the detection position $X_{det}$. The first step part 131a and the second step part 132a engage together as describes to thereby more ensure light shielding. In addition, any one of the step parts 131a, 132a may be one formed in a groove shape.

Figure 7:
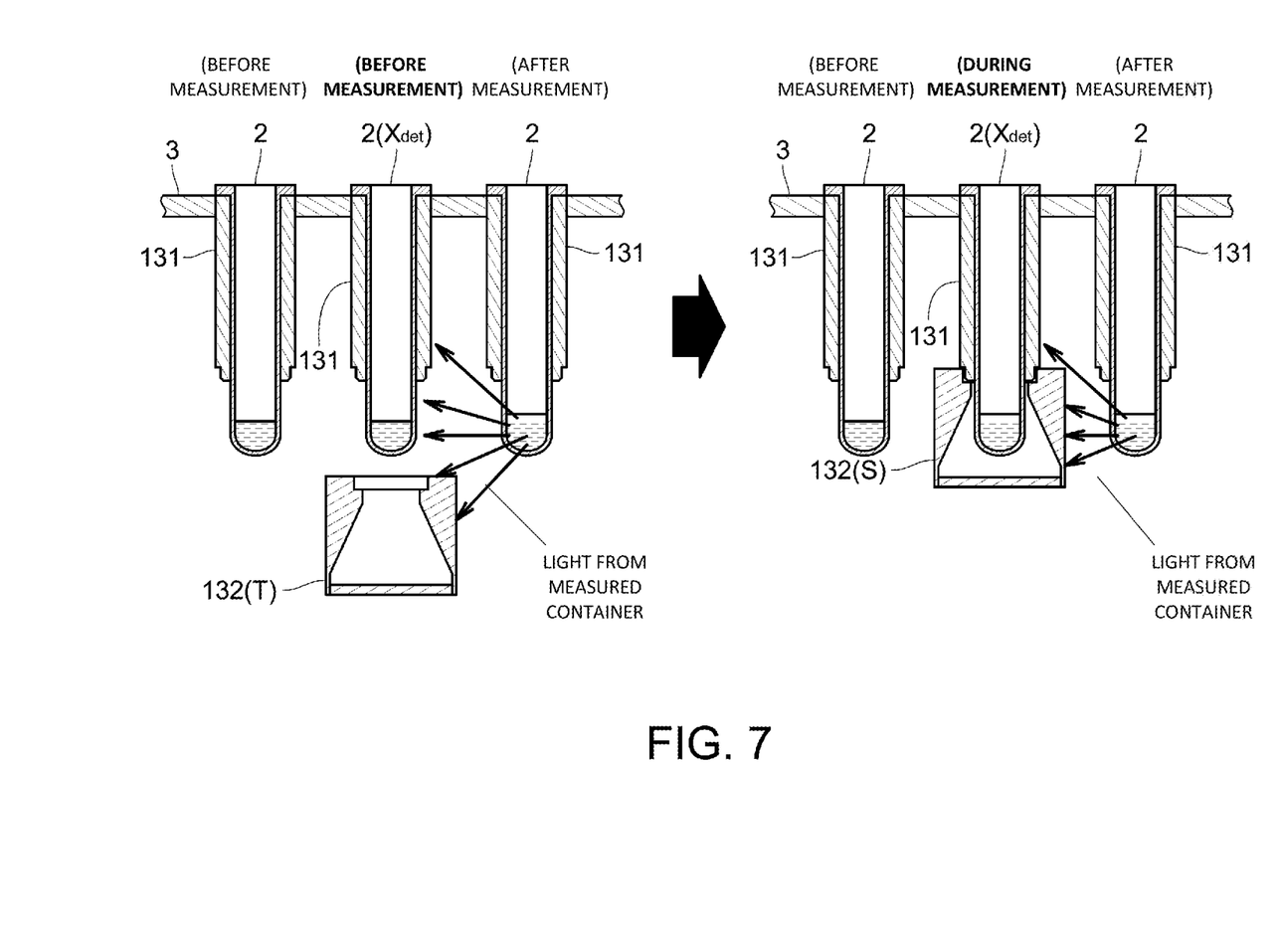
FIG. 7 is a schematic diagram illustrating respective positions of a movable side light shielding part of the light shielding mechanism in the same embodiment.

Further, as illustrated in FIG. 7, when the luminescent reagent is introduced to the sample in a container 2 by the dispensing mechanism 6, the movable side light shielding part 132 is in the light shielding position S, and when the luminescence measurement is ended to switch the container 2 at the detection position $X_{det}$, the movable side light shielding part 132 is in the withdrawal position T.

Also, the movable side light shielding part 132 in the present embodiment is one constituting the reflector 11 that guides light emitted from the sample in a container 2 at the detection position $X_{det}$, and functions as the reflector 11 by, for example, performing mirror surface finishing on the inner surface of the movable side light shielding part 132. Specifically, the inner surface of the movable side light shielding part 132 is one of a taper shape formed gradually expanded downward from the upper end opening part, and this allows the reflector 11 formed in the movable side light shielding part 132 to face the photodetector 4 side. The reflector 11 enables light emitted through the side wall of a container 2 at the detection position $X_{det}$ to be guided to the photodetector 4 side without being leaked.

<Analysis Method>

Next, an analysis method will be described together with the operation of the biological sample analysis device 100 configured as described.

For example, a large volume (e.g., 50 ml to 200 ml) of specimen is condensed to a predetermined amount (e.g., 1 μl to 1000 μl) to prepare a sample. Specimen tubes FC containing the sample are set in the temperature control mechanism 7 of the device main body 101. The temperature of the holder block 71 of the temperature control mechanism 7 is controlled to a constant temperature by the temperature control mechanism main body 72. The cover body 102 is closed with a predetermined number of specimen tubes FC set, and the measurement is started. In addition, in this state, although respective containers 2 held in the holder 3 are empty, a container 2 for standard solution measurement contains standard solution whose ATP content is known.

When the measurement is started, the controller COM controls the dispensing mechanism 6 to dispense the respective pretreatment reagents into each of the specimen tubes FC held in the temperature control mechanism 7 in accordance with a predetermined sequence. In doing so, the predetermined pretreatment (ATP extraction) is performed on the sample in the specimen tubes FC. After that, the dispensing mechanism 6 introduces the pretreated sample in the respective specimen tubes FC into the respective containers 2 held in the holder 3.

Then, the controller COM controls the holder driving mechanism 5 to move a container 2 to be measured to the detection position $X_{det}$. After moving the container 2 to be measured to the detection position $X_{det}$, the controller COM controls the lifting and lowering device 14 to move the movable side light shielding part 132 of the light shielding mechanism 13 to the light shielding position S. After setting this state, the controller COM controls the dispensing mechanism 6 to introduce the luminescent reagent into the container 2 at the detection position $X_{det}$. This allows light emitted from the sample in the container 2 at the detection position $X_{det}$ to be detected by the photodetector 4. A light intensity signal obtained by the photodetector 4 is subjected to arithmetic processing by the controller COM to calculate ATP content (amol). In addition, what used for the arithmetic processing out of the light intensity signal obtained by the photodetector 4 is an integrated signal until a predetermined time (e.g., for a few seconds) after a point in time when the luminescent reagent is introduced.

After the end of the luminescence measurement of the one container 2, the controller COM controls the lifting and lowering device 14 to move the movable side light shielding part 132 of the light shielding mechanism 13 to the withdrawal position T, and then controls the holder driving mechanism 5 to move a container 2 to be next measured to the detection position $X_{det}$. In this manner, the luminescence measurement of the sample in the respective containers 2 is performed in sequence. Note that before the luminescence measurement of the respective containers 2, the blank measurement and the standard solution measurement are performed to perform zero point calibration and span calibration.

After ending the measurement of all pieces of the sample in this manner, the cover body 102 is opened to replace the specimen tubes FC held in the temperature control mechanism 7, as well as to replace the containers 2 held in the holder 3. In addition, when replacing the containers 2 held in the holder 3, the holder 3 is detached from the device main body 101 while holding the holding holes 3h of the holder 3. Regarding the holder 3, the used and disposed pipette tips PT are in the disposal box 10 of the holder 3, and therefore by detaching the holder 3 from the device main body 101, the disposed pipette tips PT can also be simultaneously taken out of the device main body 101.

Effects of the Present Embodiment

According to the biological sample analysis device 100 of the present embodiment configured as described, since the holder 3 holding the multiple containers 2 is moved to position each of the containers 2 at the detection position $X_{det}$ by the photodetector 4 in sequence, the need for work such as after the end of the measurement of the sample in one container 2, detaching the container 2 from the holder 3 and attaching another container 2 is eliminated, making it possible to improve analysis efficiency. Also, since the light shielding mechanism 13 that, while guiding light emitted from the sample in a container 2 at the detection position $X_{det}$ to the photodetector 4, prevents light emitted from the sample in the other containers 2 from being guided to the photodetector 4 is provided, noise caused by light emitted from the sample in containers 2 after the end of the measurement can be reduced to improve analysis accuracy (detection limits). As described, according to the present embodiment, in the biological sample analysis device 100, improvements in both the analysis efficiency and the analysis accuracy (detection limits) can be achieved without difficulty.

Since the dispensing mechanism 6 introduces the reagent into a container 2 at the detection position $X_{det}$, light can be detected without being leaked from a point in time when luminescence starts. In addition, before the reagent is introduced by the dispensing mechanism 6, light emitted from the sample in containers 2 other than the container 2 at the detection position $X_{det}$ is shielded by the light shielding mechanism 13, and therefore the light can be accurately detected from the point in time when the luminescence is started.

Since the light shielding mechanism 13 is configured to be divided into the container side light shielding parts 131 fixed to the container 2 sides and the movable side light shielding part 132 movable with respect to a container 2, it is not necessary to cover the whole of the container 2 with a movable member. As a result, the movable member of the light shielding mechanism 13 can be configured to be compact, and also the configuration thereof can be simplified.

Further, since the movable side light shielding part 132 constitutes the reflector 11 that guides light emitted from the sample in a container 2 at the detection position $X_{det}$ to the photodetector 4, the light emitted from the sample can be efficiently guided to the photodetector 4.

Since the light shielding mechanism 13 covers the entire circumference of a container 2 at the detection position $X_{det}$, light emitted from containers 2 other than the container 2 at the detection position $X_{det}$ is not only shielded as much as possible, but other stray light is also shielded, thereby making it possible to further reduce noise.

OTHER EMBODIMENTS

Note that the present invention is not limited to the above-described embodiment.

For example, the holder 3 is one that holds the multiple containers 2 on the same circle, but may be one that holds them along predetermined directions, such as in a matrix. In this case, it is conceivable that the holder driving mechanism 5 is configured to linearly move the holder 3 in the horizontal direction (the X-axis direction and the Y-axis direction).

Also, a container side light shielding part 131 of the light shielding mechanism 13 may be one formed integrally with a container 2. For example, the container side light shielding part 131 may be configured by, for example, forming the upper part of the container 2 from a member not having optical transparency. Further, the container side light shielding part 131 may be configured by winding a film not having optical transparency on the upper part of the container 2 or other means.

Still further, the light shielding mechanism 13 may be one having no container side light shielding part 131. In this case, it is conceivable that the movable side light shielding part 132 of the light shielding mechanism 13 is configured to cover the whole of a part of a container 2 exposed on the lower side of the holder 3. This configuration eliminates the need to providing light shielding parts for the holder 3 and the containers 2, and therefore the holder 3 and the containers 2 can be simplified in configuration and also reduced in weight.

In addition, when opening the cover body 102, the photodetection surface of the photodetector (e.g., PMT) may be deteriorated or damaged upon receipt of external intense light. In this case, it is desirable to provide a shutter member for protecting the photodetector at the front of the photodetector. Given the configuration in the above-described embodiment, it is conceivable that, for example, the shutter member is provided so as to block the upper end part opening of the movable side light shielding part 132 in the withdrawal position T.

In the above-described embodiment, the photodetector 4 is configured to move up and down, but can also be configured not to be moved. In this case, the light shielding mechanism 13 shields the photodetector 4 from light by moving the movable side light shielding part 132 without moving the photodetector 4.

Figure 8:
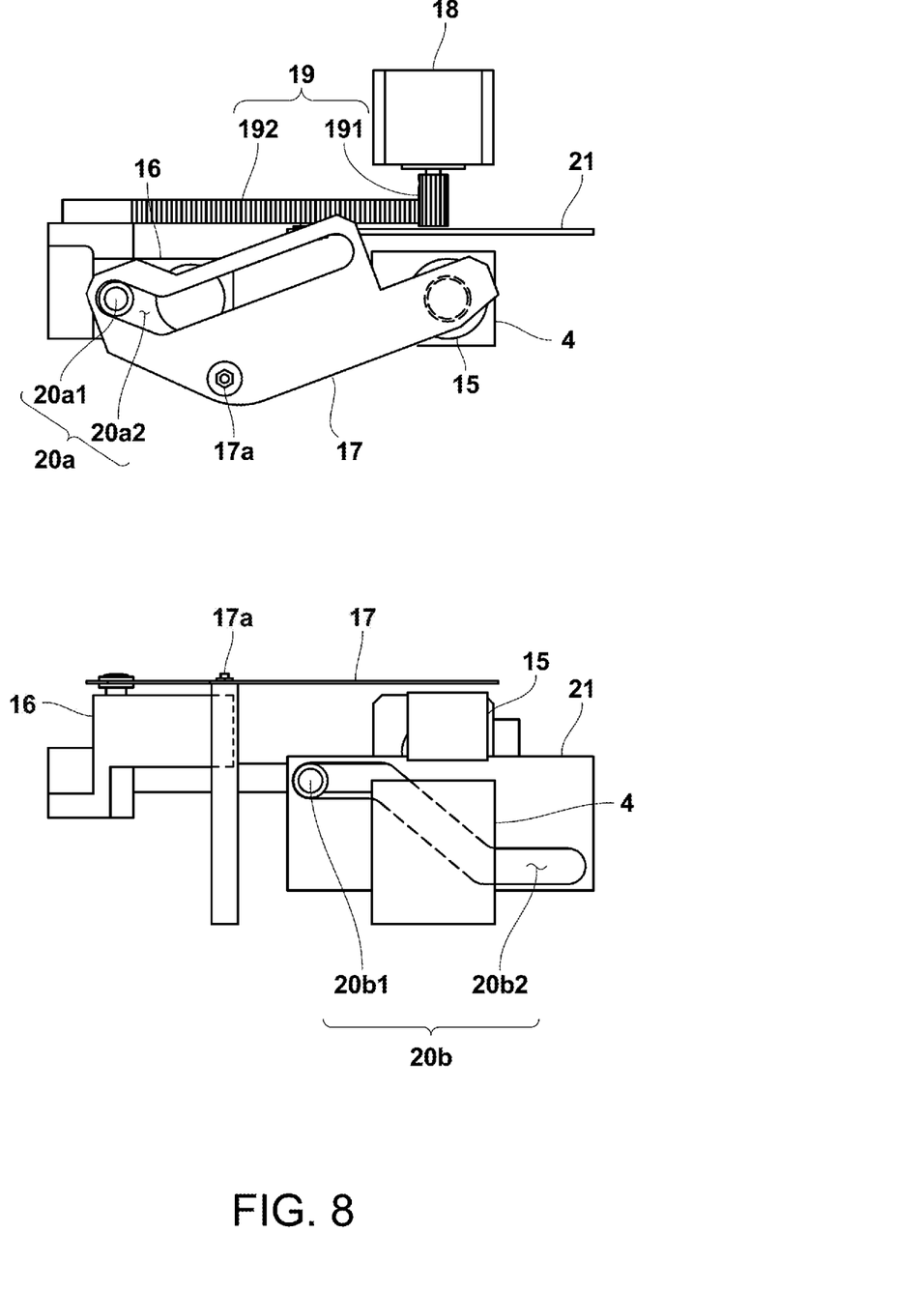
FIG. 8 is a schematic diagram illustrating a movable side light shielding part and its drive mechanism in a variation (first state).
Figure 9:
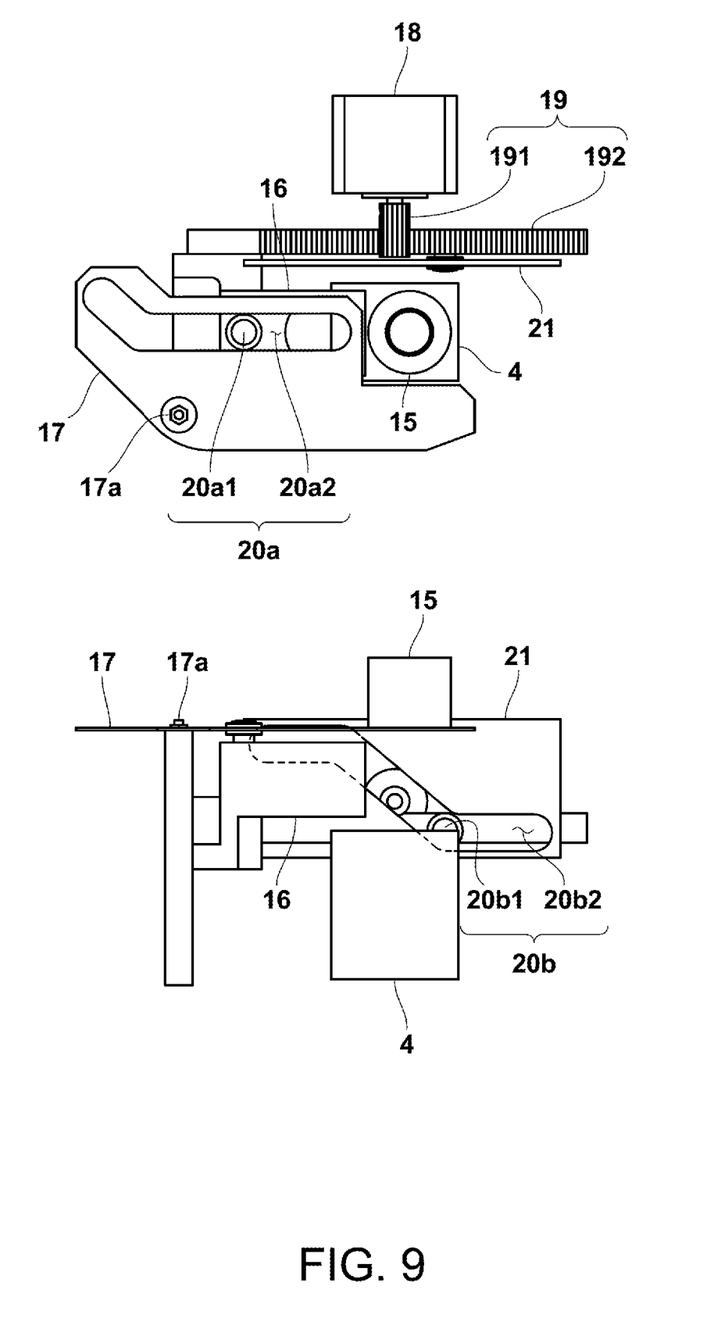
FIG. 9 is a schematic diagram illustrating the movable side light shielding part and its drive mechanism in the variation (second state).
Figure 10:
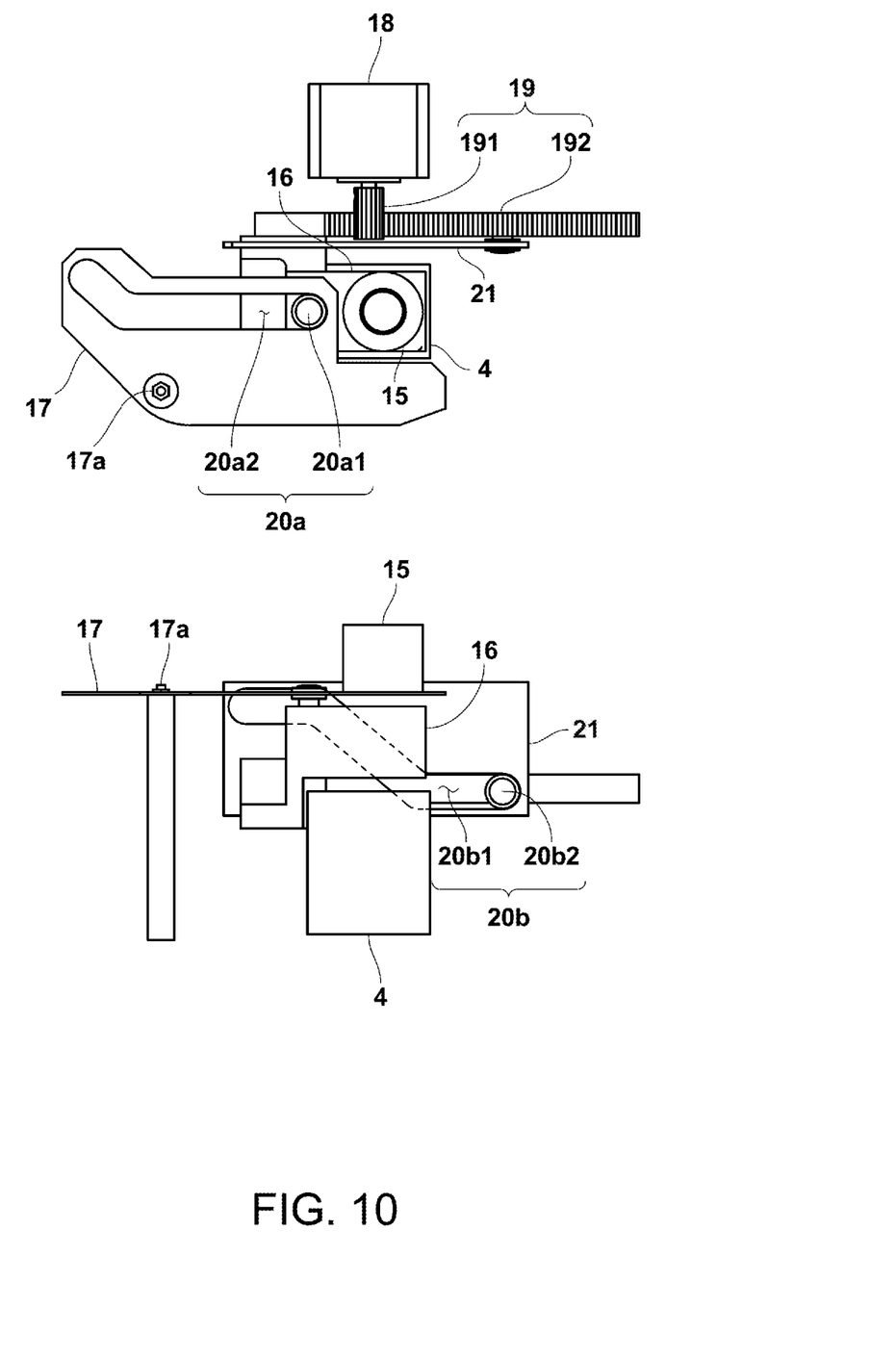
FIG. 10 is a schematic diagram illustrating the movable side light shielding part and its drive mechanism in the variation (third state).

Specifically, as illustrated in FIG. 8 to FIG. 10, the movable side light shielding part 132 of the light shielding mechanism 13 has: a reflector 15 that moves up and down with respect to a container 2 at the detection position $X_{det}$; and a light guiding member 16 that moves back and forth between the reflector 15 and the photodetector 4. Also, in the example of FIG. 8 to FIG. 10, a shutter member 17 is configured to move in conjunction of the movements of the reflector 15 and the light guiding member 16.

The reflector 15 is one whose inner surface is of a taper shape formed gradually expanded downward from the upper end opening part. Also, the light guiding member 16 is one that is connected to the lower end opening part of the reflector 15 and whose inner surface is of a cylindrical shape.

In addition, the movements of the reflector 15, light guiding member 16, and shutter member 17 are configured by a single motor 18, a rack-and-pinion mechanism 19 that converts the rotation of the motor 18 into rectilinear movement, and multiple cam mechanisms 20a, 20b that are operated by the rectilinear movement of the rack-and-pinion mechanism 19.

The rack-and-pinion mechanism 19 consists of: a pinion gear 191 provided on the rotary shaft of the motor; and a rack gear 192 that is rectilinearly moved by the pinion gear 191. The rack gear 192 is fixed with the light guiding member 16. The movement of the rack gear 192 allows the light guiding member 16 to move back and forth between the reflector and the photodetector.

The first cam mechanism 20a is provided interposed between the light guiding member 16 and the shutter member 17. The second cam mechanism 20b is provided interposed between the rack-and-pinion mechanism 19 and the cam mechanism 20b.

The first cam mechanism 20a includes: a driven part 20a1 provided to the light guiding member 16, such as a pin or a bearing; and a guide part 20a2 that is one along which the driven part 20a1 slides and provided in the shutter member 17. The shutter member 17 is rotated around a rotary shaft 17a by the cam mechanism 20a to move between a shielding position (see FIG. 8) to shield light incident on the photodetector 4 and a withdrawal position (see FIG. 9, FIG. 10) withdrawn from the shielding position.

The second cam mechanism 20b includes: a driven part 20b1 provided to the rack gear 192, such as a pin or a bearing; and a guide part 20b2 that is one along which the driven part 20b1 slides and provided in a support member 21 fixed with the reflector 15. In the cam mechanism 20b, the rack gear 192 moves, and thereby the reflector 15 is move between a lifted position (see FIG. 9, FIG. 10) to cover the lower part of a container 2 and a lowered position (see FIG. 8) separated from the lower part of the container 2.

Further, in a state where the reflector 15 is in the lifted position of covering the lower part of the container 2, the light guiding member 16 gets in between the reflector 15 and the photodetector 4 (see FIG. 10). In this state, the reflector 15, the light guiding member 16, and the photodetector 4 are vertically aligned in line, and light emitted from the sample in the container 2 is detected by the photodetector 4.

On the other hand, in a state where the light guiding member 16 is in the withdrawal position of being withdrawn from between the reflector 15 and the photodetector 4, the reflector 15 is separated from the lower part of the container 2 (see FIG. 8). At this time, the reflector 15 covers the upper surface of the photodetector 4, and also the upper opening part of the reflector 15 is closed by the shutter member 17.

In addition, in the above, the shutter member 17 is configured to close the upper opening part of the reflector 15, but may be configured to be provided between the reflector 15 and the photodetector 4 by providing the light guiding member 16 with the shutter member 17, or other means.

In the above, the photodetector 4 is configured not to be moved, but the light shielding mechanism is configured to be moved; however, the holder 3 may be configured to be moved without moving the photodetector 4 and the light shielding mechanism 13.

Also, in the above, the light guiding member 16 is configured to be provided between the reflector 15 and the photodetector 4; however, without providing the light guiding member 16, the lower opening part of the reflector 15 may be configured to be provided with a condenser lens to condense light and guide it to the photodetector 4.

Further, the photodetector may be configured to be provided with a shutter mechanism.

The configuration of the light shielding mechanism is not limited to the above-described embodiment, but may be one that shields light by laterally sandwiching a container at the detection position. Specifically, it includes a first side light shielding part for covering the entirely vertical side on one side of the container and a second side light shielding part for covering the entirely vertical side on the other side of the container, and the side light shielding parts are configured to be movable back and forth with respect to the container at the detection position. Even this configuration makes it possible to, while guiding light emitted from the sample in the container at the detection position to the photodetector, prevent light emitted from the sample in the other containers from being guided to the photodetector.

Further, in the case of the configuration in which the holder 3 holds the multiple containers 2, a configuration for measuring mutually adjacent containers 2 in sequence may require measures such as enhancing the light shieldability of the light shielding mechanism 13. For this reason, when successively measuring the multiple containers 2 held in the holder 3, it is conceivable that mutually nonadjacent containers 2 are configured to be measured in sequence without successively measuring mutually adjacent containers 2.

In this case, the holder driving mechanism 5 is configured to position mutually nonadjacent containers 2 at the detection position $X_{det}$ by the photodetector 4 in sequence. For example, as illustrated in FIG. 5, it is not that the containers 2 from numbers 1 to 24 are measured in numerical order, but conceivable that they are divided into two or more groups each configured to include mutually nonadjacent containers 2, such as (1) 1, 4, 7, . . . , (2) 2, 5, 7, . . . , and (3) 3, 8, 9, . . . , and containers 2 included in each group are positioned at the detection position $X_{det}$ in sequence.

By positioning containers 2 at the detection position $X_{det}$ in sequence in this manner, a distance interval from a previously measured container 2 is kept and a time interval from an adjacent container 2 is kept, thereby making it possible to eliminate the need for measures such as enhancing the light shieldability of the light shielding mechanism 13, and to suppress stray light by a measurement protocol.

Besides, it goes without saying that the present invention is not limited to the above-described embodiment, but can be variously modified without departing from the scope thereof.

INDUSTRIAL APPLICABILITY

According to the present invention, improvements in both analysis efficiency and analysis accuracy can be achieved without difficulty.

The invention claimed is:

1. A biological sample analysis device that analyzes light generated by an organism-derived substance contained in a sample, the biological sample analysis device comprising:
   a holder that holds multiple containers containing the sample;
   a photodetector that is fixed at a predetermined position;
   a holder positioner that moves the holder to position each of the multiple containers held in the holder at a detection position by the photodetector in sequence; and
   a light shield that, while guiding light emitted from the sample in a container at the detection position to the photodetector, prevents light emitted from the sample in the other containers from being guided to the photodetector, wherein
   the light shield comprises a movable side light shielding part that moves back and forth with respect to the container at the detection position, as well as covers a lower part of the container at the detection position, and
   the movable side light shielding part includes a reflector arranged between the container in the detection position and the photodetector, the reflector having a reflective surface that guides the light emitted from the sample in the container at the detection position to the photodetector.

2. The biological sample analysis device according to claim 1, further comprising
   a dispenser that, into the containers, introduces a reagent that reacts with the organism-derived substance to generate light, wherein
   the dispenser introduces the reagent into the container at the detection position.

3. The biological sample analysis device according to claim 1, wherein
   the light shield further comprises container side light shielding parts that are provided to the each of the multiple containers and cover upper parts of the respective containers.

4. The biological sample analysis device according to claim 1, wherein
   the light shield covers an entire circumference of the container.

5. The biological sample analysis device according to claim 1, wherein
   the light shield shields the photodetector from light by moving the movable side light shielding part without moving the photodetector.

6. The biological sample analysis device according to claim 5, wherein
   the reflector moves up and down with respect to the container at the detection position,
   the movable side light shielding part includes a light guiding member that moves back and forth between the reflector and the photodetector, and
   in a state where the reflector is in a lifted position of covering the lower part of the container, the light guiding member gets in between the reflector and the photodetector, and in a state where the light guiding member is in a withdrawal position of being withdrawn from between the reflector and the photodetector, the reflector is separated from the lower part of the container.

7. The biological sample analysis device according to claim 6, wherein
   the movements of the reflector and the light guiding member are configured by a single motor, a rack-and-pinion mechanism that converts rotation of the motor into a rectilinear movement, and multiple cam mechanisms that are operated by the rectilinear movement of the rack-and-pinion mechanism.

8. The biological sample analysis device according to claim 6, wherein
   in conjunction with the movements of the reflector and the light guiding member, a shutter member that shields light incident on the photodetector moves to a shielding position of shielding light incident on the photodetector.

* * * * *